Feb. 14, 1933.   J. T. BLAIR   1,897,382
WEATHER SHIELD
Filed Jan. 22, 1932   2 Sheets-Sheet 1
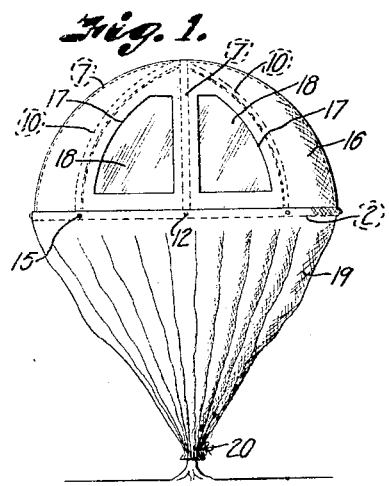
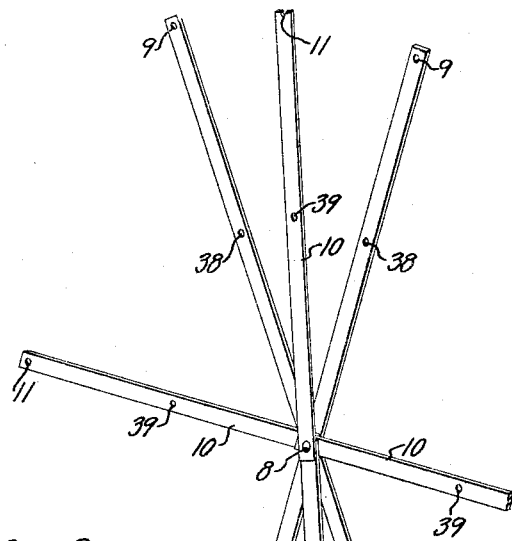
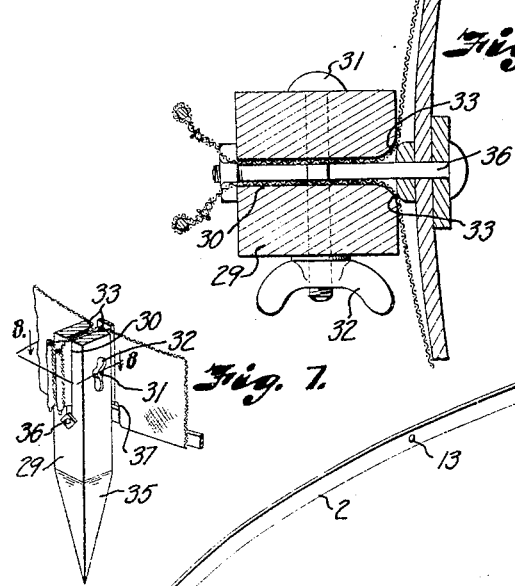
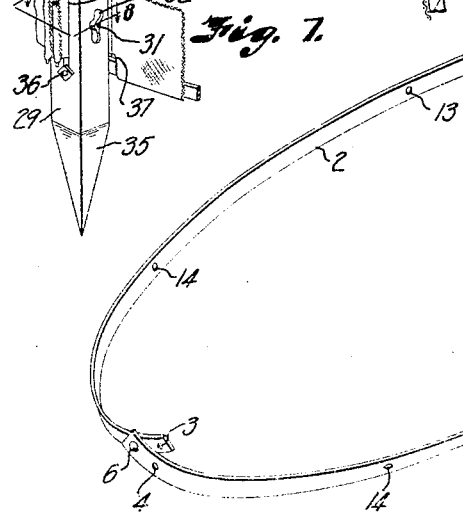
John T. Blair
INVENTOR
BY
ATTORNEY Feb. 14, 1933.  J. T. BLAIR  1,897,382
WEATHER SHIELD
Filed Jan. 22, 1932  2 Sheets-Sheet 2
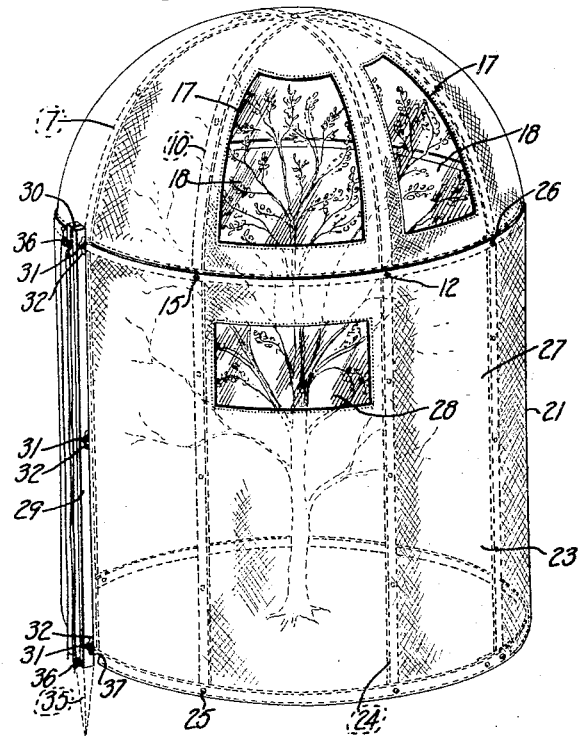
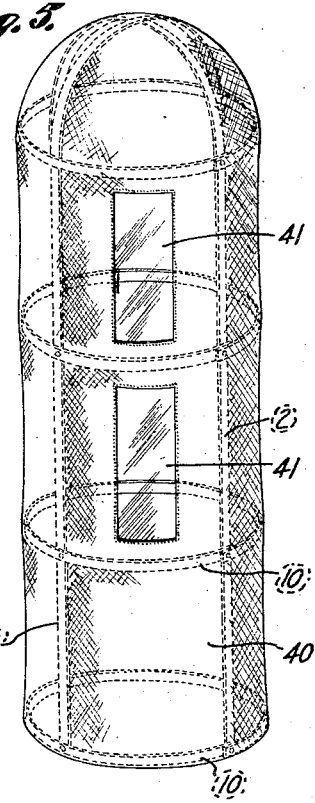
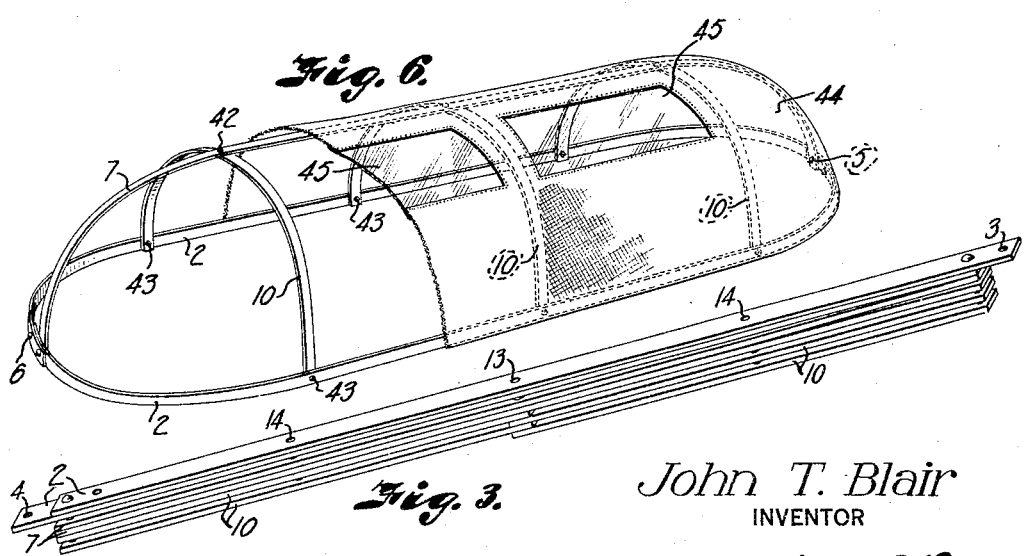
John T. Blair
INVENTOR
BY *Arthur C. Brown*
ATTORNEY Patented Feb. 14, 1933

1,897,382

UNITED STATES PATENT OFFICE

JOHN T. BLAIR, OF TULSA, OKLAHOMA

WEATHER SHIELD

Application filed January 22, 1932. Serial No. 588,123.

My invention relates to shields and more particularly to weather shields for the protection of fruit trees, shrubbery, vegetables and the like; the principal object of my invention being to provide a protecting device of this character which may be compactly folded for storage when not in use, and which may be readily applied to a plant when required.

It is the further object of my invention to provide a frame for a weather shield which may be readily converted into different shapes to accommodate a large variety of trees and plants.

Another object of my invention is to embody light transmitting means in a shield at such points as will insure proper distribution of sunlight to a growing plant.

In accomplishing these and other objects of my invention, I have provided improved details of structure, the preferred forms of which are illustrated in the accompanying drawings, wherein:

Fig. 1 is an elevational view of one form of a shield mounted in functional position on a tree.

Fig. 2 is a perspective view of the shield frame shown in partly opened condition.

Fig. 3 is a perspective view of the frame in condition for storage.

Fig. 4 is a perspective view of a modified form of shield including a supplementary supporting unit for relieving the tree of any supporting load.

Fig. 5 is a perspective view illustrating the frame members assembled in a slightly different manner to accommodate a shield for relatively tall plants.

Fig. 6 is a perspective view disclosing a further modified arrangement of the frame members, a portion of the cover being broken away to more clearly disclose the shield construction.

Fig. 7 is a fragmentary view of the lower end of a slotted support with the free side edges of a shield in clamped position within the slot of the support.

Fig. 8 is an enlarged cross sectional view on the line 8—8 Fig. 7.

Referring more in detail to the drawings:

1 designates a frame preferably constructed of flexible metal or wood bars of various lengths, thus permitting assembly of the bars into frames of different shapes as will be presently more fully described.

A pair of bars 2 are used for constructing the base portion, and their ends are provided with pairs of aligned openings 3 and 4. As particularly shown in Fig. 2, the ends of the base bars over-lap and bolts or rivets 5 and 6, extended through the aligned openings, connect the overlapped ends. In this manner the bars may be folded for storage or may be swung apart to form a circumferential base and, when in the latter position, bolts are extended through the remaining openings in the overlapped ends to rigidly secure the bars together.

Another pair of bars 7, of substantially the same length as the base bars and connected at their centers by a pivot 8, are used for main arch members and are each provided adjacent their ends with an opening 9. A plurality of supplementary bars 10, preferably four in number and of a length approximately one-half that of the main bars, are connected at their inner ends to the pivot 8, and are provided adjacent their outer ends with apertures 11.

One end of one of the main bars is permanently connected to the base, as for example by the bolt 5, and its opposite end may be attached to the base by the bolt 6 when assembling the frame for use. The other main bar may be turned on the pivot into transverse relation with its cooperating arch member, and bolts 12, or the like, are extended through the aperture 9 and through corresponding openings 13 in the base bars.

Further openings 14 are provided in the base bars mid-way between their centers and ends for receiving bolts 15 extended therethrough and through the apertures 11 in the supplementary bars so that, when in operable position, the frame is dome-shaped as indicated in dotted lines in Figs. 1 and 4.

A cover 16, of canvas or paper, is mounted over the frame and is secured to the base bars by the bolts 5, 6, 12 and 15, or in any other convenient manner.

Provided in the cover are a pair of adjacent openings 17 corresponding in form substantially to the sectors defined by the arch members, and the openings are closed by light transmitting panes 18 of cello-glass or similar flexible transparent material for transmitting sun light to the covered plant.

If the shield is to be supported entirely by the tree as shown in Fig. 1, an additional jacket or lower shield member 19 is provided, having its upper edge secured to the base of the shield dome and its lower end gathered around the tree trunk where it may be fastened by means such as a draw string 20.

For trees unable to bear the weight of the shield a cylindrical support 21 is provided as shown in Fig. 4. This support comprises a skeleton frame including a base 23 identical to the base of the dome-shaped shield member, and upright bars 24 comprising either the members 2 or 7, and equal in number to the arch branches of the dome, are connected at their lower and upper ends to the lower and upper base members as respectively indicated at 25 and 26.

A covering 27, of material such as is used for the shield dome, is passed around the lower frame section and its lower and upper ends may be secured to the corresponding base members by the fastening means 25 and 26. If desired, a window 28 may be provided in the lower shield section in alignment with one of the windows in the upper section.

In order to firmly connect the free vertical edges of the covering 27, a post or support 29 is provided having a longitudinal slot 30 through which the free edges are drawn, whereupon bolts 31, extended transversely through the slotted post, and provided with wing nuts 32, are tightened for securely clamping the edges of the cover between the post.

It will be obvious that suitable tightening elements other than bolts may be employed for clamping the slotted post together.

As is particularly shown at 33 in Fig. 8, the edges of the slot adjacent the covering are rounded to prevent undue wear of the covering material.

A pointed end 35 of the pole extends downwardly below the shield and may be driven into the ground for firmly anchoring the shield, and bolts 36 extended through the base members and through the slot of the post, as shown in Fig. 8, anchor the shield to the post, it being necessary to notch the covering as indicated at 37 to permit projection of these bolts through the slot.

When tall slender plants or trees are to be protected, a frame is assembled, as shown by dotted lines in Fig. 5. For this purpose long bars 2 or 7 are used for the upright supports and the base and intermediate rings or bands are each formed of a pair of the short bars 10.

In order to permit use of the same long and short bars for the tall form which are used for the other forms, the long bars 7 are provided with openings 38 intermediate their centers and ends, and the short bars are also provided mid-way between their ends with apertures 39. Upon assembling the rings or bands with the upright supports to produce the tall form the frame is covered with suitable material 40 preferably provided with windows 41.

A further modification in the form of the frame may be obtained by connecting the bars as shown in Fig. 6. It will be noted that, in constructing the latter shield, a pair of long base bars 2 are used, identical to those used for the base of the dome-shaped form and a single longitudinal arch member 7 is connected at its opposite ends to the base. Three of the short bars 10 are bent into arches having their backs connected to the longitudinal arch by bolts 42, and their ends secured to the base by means such as bolts 43.

A covering 44, formed to fit the frame, is mounted thereover and may be secured by the bolts 43 to the base. Windows 45 are also preferably provided in the cover 44.

From the foregoing, it will be apparent that any one of the various forms of frames shown may be constructed from a standard stock of long and short bars. The dome-shaped form, however, is considered to be the preferred shape since, in this form all of the bars remain inter-connected, even when folded, as particularly illustrated in Figs. 2 and 3.

If a cover of paper or closely woven cloth is used, it may be necessary to provide suitable vent openings therein to permit circulation of air around the plant, particularly when the shield is left on the plant for long periods of time.

Artificial heat, derived from electric lamps or the like, may be supplied successfully within the shield if desired for promoting growth of the plant, since the substantially tight covering will retain the heat without undue loss.

What I claim and desire to secure by Letters Patent is:

1. In a device of the character described, a frame including cooperating flexible base members, means for pivotally connecting said members adjacent their ends to permit folding of the members or formation of a circumferential base, flexible arch members pivotally connected at their approximate centers and having free ends, and means for securing said free ends to the base members.

2. In a device of the character described, a frame including a pair of flexible base members, means for pivotally connecting said members adjacent their ends to permit folding of the members or formation of a circumferential base, flexible arch members pivotally connected at their approximate centers and having free ends, and means for securing said free ends to the base members.

3. In a device of the character described, a frame including cooperating flexible base members having ends adapted to be connected to form a circumferential base, flexible main arch members adapted to span the base members, means for connecting the ends of the arch members to the base members, a pivot for connecting said main members at their approximate centers, and supplementary arch members having opposite ends connected respectively to said pivot and to the base members.

4. In a device of the character described, a frame including a pair of flexible base members, means for pivotally connecting said members adjacent their ends to permit folding of the members or formation of a circumferential base, flexible main arch members adapted to span the base members, means for connecting the ends of the arch members to the base members, a pivot for connecting said main members at their approximate centers, supplementary arch members having one end connected to said pivot, and means for connecting the opposite ends of the supplementary members to the base members.

5. In a device of the character described, a frame including cooperating flexible base bars, means for pivotally connecting said bars adjacent their ends to permit folding of the bars or formation of a circumferential base, flexible arch bars pivotally connected at their approximate centers and having free ends, one end of one of said bars being connected to the base by the means connecting the base bars to permit folding of the arch bars in parallel alignment and connected condition with the base bars, and means for connecting the other free ends of the arch bars to the base bars.

6. In a device of the character described, a frame including a circumferential base bar, flexible arch bars connected at their approximate centers and having free ends, means for securing said free ends to the base bar to produce a dome-shaped frame divided in sectors by the arch bars, a flexible cover for said frame, and flexible transparent windows in the cover in two adjacent sector spaces defined by the arch bars.

7. A device of the character described including a shield having a closed top and free side edges, a support slotted longitudinally to produce spaced portions for receiving said free edges of the shield therebetween and having a pointed portion projecting below the shield, and means for clamping the spaced portion of the support together to secure the support to the free edges of the shield.

8. A device of the character described including a shield having a closed top and free side edges, a support having a longitudinal slot forming spaced portions having rounded edges for receiving therebetween the free edges of the shield, and means for clamping the spaced portions of the support together to adjustably secure the free edges of the shield to the support.

In testimony whereof I affix my signature.
JOHN T. BLAIR.